Oct. 8, 1963   B. H. ROETHLER   3,106,042
MAGNETIC TOY FOR SIMULATING EARTH-WORKING OPERATIONS
Filed Oct. 20, 1960

*INVENTOR.*
BABE HENRY ROETHLER
BY
ATTORNEY

3,106,042
MAGNETIC TOY FOR SIMULATING EARTH-WORKING OPERATIONS
Babe H. Roethler, Tokyo, Japan
(Camp Fuchinoc, Kanagawa-ken, Japan)
Filed Oct. 20, 1960, Ser. No. 63,863
Claims priority, application Japan Oct. 26, 1959
1 Claim. (Cl. 46—240)

This invention relates to a toy and educational device and, more particularly, to a device for entertainment and instruction in the simulated operation of various types of earth-moving power-operated machines.

It is the chief purpose of the invention to provide a device, in the nature of a toy, wherein various miniature or toy devices simulating, for example, a power-driven roller, a scraper, and a bulldozer, are selectively and individually movable by a manually-operated magnet, over a layer of loose granular material such as sand or other non-magnetic powder, confined within a flat box-like structure.

Other objects and advantages of the invention will appear to those skilled in the art, after a study of the following detailed description in connection with the accompanying drawing, wherein.

Figure 1:
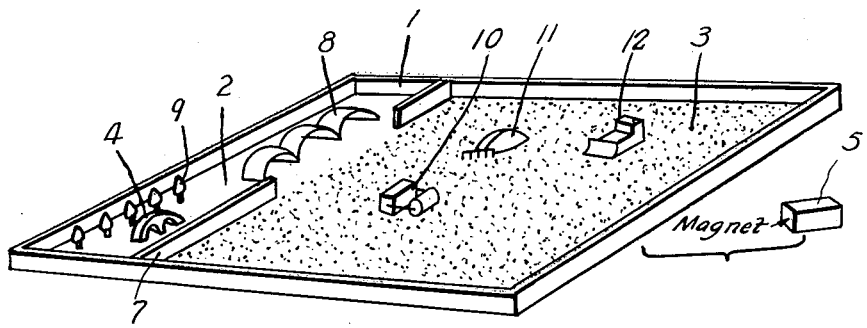
FIGURE 1 is a perspective view of the complete device.

Referring in detail to the drawing, a generally square base plate 2 has a rim 1 secured to and upstanding from its edges, to confine a layer 3 of sand or other non-magnetic granular or pulverulent material. As depicted upon FIGURES 2 and 3, a lid 6 of transparent material covers the area within rim 1.

Within the confines of rim 1 there are positioned various items such as simulations of a bridge 4, a fence 7, hangar 8, trees 9, etc. Also located upon the layer of sand are toy devices simulating various power-driven earth-working machines such as roller 10, scraper 11 and bulldozer 12, all of which are made of iron or other magnetic material. Various other items each representing a corresponding type or kind of power-driven earth-working machine may be added and, like 10, 11 and 12, will be made of magnetic material or incorporate therein a mass of such material. Thus each machine simulation may be moved about over the surface of plate 2 by corresponding movement of a magnet 5 below and contiguous to the plate. In this way the respective characteristics and manner of operation of the several machines may be demonstrated and taught by operation upon sand 3, to simulate earth scraping, breaking and grading, for example, as well as gathering and heaping earth or snow.

Figures 2, 3:
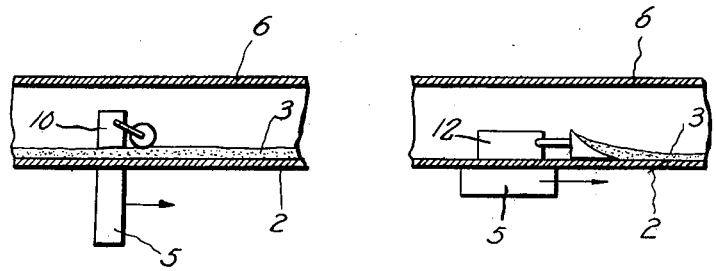
FIGURE 2 is a detail view, partly in section, showing use of the device to simulate earth rolling.
FIGURE 3 is a detail view partly in section showing use of the device to simulate bulldozing.

FIGURE 2 shows how magnet 5 when moved in the direction of the arrow effects a corresponding movement of roller-simulating device 10. FIGURE 3 illustrates how the magnet, when moved in the direction indicated by the arrow, correspondingly moves a bulldozer-simulating toy 12 to collect a quantity of sand and shift it to another location.

Lid 6 serves to prevent loss of sand and other items within walls 1. Since it is made of transparent material, the lid need not be removed in use. Being easy and inexpensive to construct and simple to operate, the invention is entertaining to children and valuable in instructing and demonstrating to them the mode of operation of the various power-driven earth-working machines.

I claim:

A toy comprising a normally-horizontal planar base sheet of material having upstanding side walls along its edges, a layer of loose, granular, non-magnetic material covering said sheet and confined within said side walls, a plurality of discrete mobile devices positioned on said layer of granular material each said device simulating in miniature a power-driven roller, a scraper, and a bulldozer, respectively, each said device including a mass of magnetic material and being independently movable over said layer of granular material to effect a corresponding earth-working operation thereon, and a magnet positioned below and contiguous to the lower surface of said plane base sheet and having no mechanical connection therewith, said magnet being universally manually movable relative to said sheet to selectively magnetically attract and move any selected one of said mobile devices in earth-working movement over and upon said granular material.

References Cited in the file of this patent

UNITED STATES PATENTS

| 546,171 | Mantel | Sept. 10, 1895 |
|---|---|---|
| 1,123,066 | Barber | Dec. 29, 1914 |
| 2,589,601 | Burnett | Mar. 18, 1952 |
| 2,842,896 | Sire | July 15, 1958 |
| 2,853,830 | Herzog | Sept. 30, 1958 |
| 2,896,367 | Glass et al. | July 28, 1959 |

FOREIGN PATENTS

| 1,094,712 | France | Dec. 8, 1954 |